Jan. 24, 1967     L. H. QUELLAND ET AL     3,300,636

AUTO LIGHT HOLDER

Filed March 12, 1964

INVENTORS
K. E. QUELLAND
L. H. QUELLAND

3,300,636
AUTO LIGHT HOLDER
Leonard H. Quelland and Kathryn Elworth Quelland, both of 3044 Stone St., Omaha, Nebr. 68111
Filed Mar. 12, 1964, Ser. No. 351,494
3 Claims. (Cl. 240—90)

This invention relates to shock cushioned vehicle lamps such as are used on buses and trucks and other vehicles traveling on public highways and more particularly it is an objective to provide a new way to shock cushion such lamps in a manner more permanently effective and dependable than shock cushioning methods heretofore used.

Although the shock cushioning of fragile parts in other fields has been heretofore done by suspension on springs, yet to my knowledge no one has heretofore applied the principle of tension spring suspension to the bulb and socket assembly of vehicle lamps, as is an object of this invention.

A still more important object of the invention is in the provision of means in the form of an anchoring assembly to which a bulb and socket assembly is suspended, the anchoring member being so readily and quickly insertable into the conventional lamp housing as to make practical the resilient supporting of a bulb socket.

In the prior art, perhaps for lack of quick and effective and economical means of practically supporting bulb sockets, rigidly supported sockets have continued to be the conventional and dangerous normal condition.

Road shock and vibrations frequently cause bulbs to go out, creating death and maiming, through serious accidents from out-of-control vehicles. Warning lights have come to be taken for granted to an extent that many drivers feel secure whenever they do not see warning lights on other vehicles, which can lead to serious accidents.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
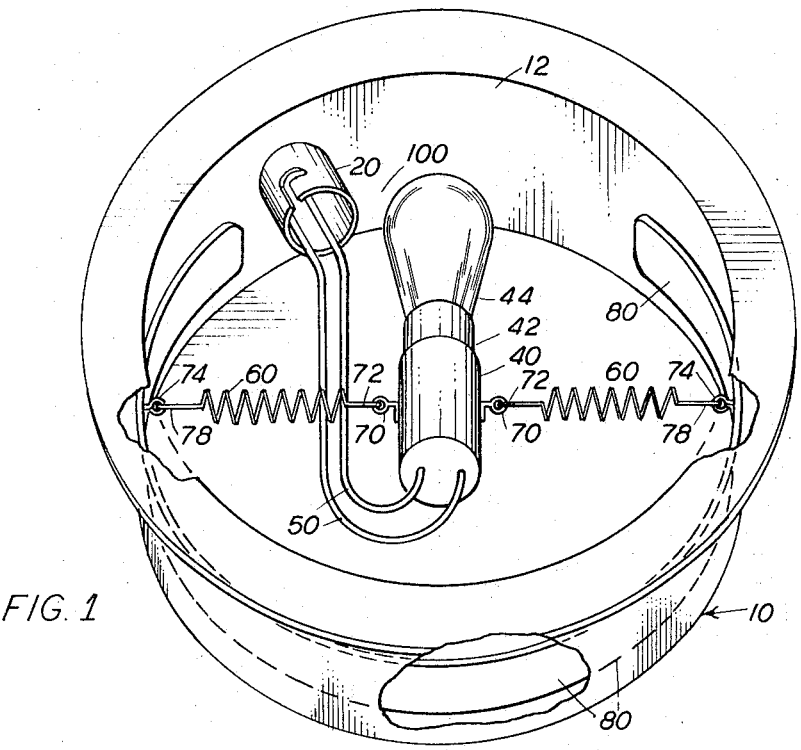
FIGURE 1 is a perspective view of a light housing for a wheeled vehicle shown with the auto light holder of this invention mounted therein.
Figure 2:
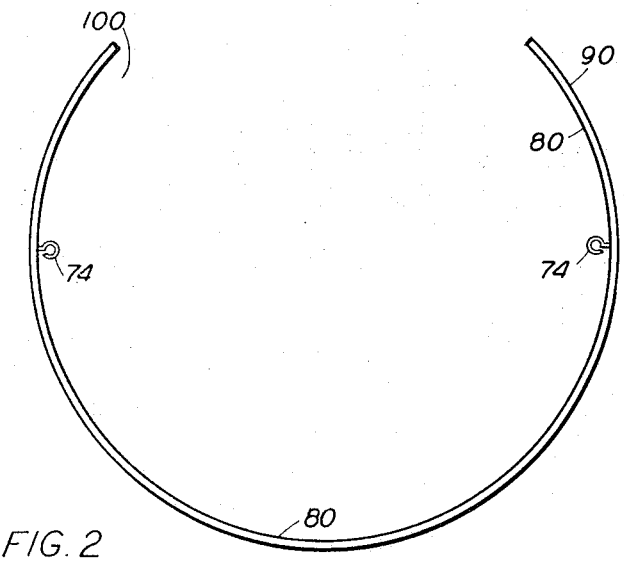
FIGURE 2 is a top plan view of an anchoring member of the invention.

Referring to FIGURE 1 a light housing 10 of a wheeled vehicle of the public road traveling type such as a truck, bus, automobile or trailer.

The housing 10 is provided with a cylindrical inner wall 12 which is normally covered on its outer side by a transparent cover, not shown. A conventional bulb socket 20 projects inwardly from one side of the cylindrical wall 12 and normally suports a bulb in conventional practice.

However, in accordance with my invention the bulb is not placed in the conventional socket 20 but is instead placed in a suspended like socket 40 of our invention, the socket 40 being part of a socket and bulb assembly 42 and having a bulb 44 mounted therein.

Wires 50 leading from the socket 40 extend into the socket 20 to make suitable electrical connection for the lighting of the bulb 44 in exactly the same manner as it would be lit if it were in the socket 20.

The socket and bulb assembly 42 is suspended in an area outlined by the side wall 12 and spaced therefrom.

At least two resilient shock absorbing members 60 are provided extending away from the socket 40 in sufficient directions for substantially maintaining the socket assembly 42 in a desired position spaced from the sides 12 of the housing 10.

The resilient shock absorbing members 60 are preferably tension springs and are each attached to an eyelet 70 which latter is fixed to the socket 40, each spring 60 having an eyelet 72 on its end which is received through the eyelet 70.

Outer ends of each spring 60 are attached by eyelets 74 to the inner side of an anchoring member 80 which can also be called a wall engaging member.

The wall engaging member 80 presses against the cylindrical wall 12 at sufficient points for holding the wall engaging member 80 in place against the cylindrical wall 12 under the circumstance of normal vibratory forces to which this cylindrical wall 12 would be subjected during normal operation of a vehicle on the highways and roadways.

The outer ends of the spring 60 are attached to the wall engaging member 80 by means of eyelets 74 and by eyes 78 in the outer ends of the springs 60.

The resiliency or springiness of the wall engaging member 80 is sufficient to permit it to be bent inwardly from a normal C-shaped configuration, sufficiently to permit movement of the side wall engaging outer surface 90 thereof in directions away from the side wall 12 for permitting movement of the anchoring member with respect to the side wall 12 during assembly and disassembly.

As thus described assembly is quickly accomplished by simply springing the C-shaped wall engaging member 80 inwardly inserting it into the cylindrical wall 12 and then permitting it to expand against the cylindrical wall 12 to exert pressure thereagainst.

We have found that much labor time is saved by this particular method of mounting a suspended light bulb and socket assembly.

The reason the wall engaging member or anchoring member 80 is in a C-shape is to provide a recess generally indicated at 100 between the ends of the wall engaging member 80 for receiving the light bulb 44 and also the entire socket and bulb assembly 42 in order that the socket and bulb assembly 42 can be spaced away from the wall 12 and also from the supporting member 80.

The recess 100 also serves the purpose of receiving therein the conventional socket 20 so that the latter need not be removed in order to utilize this invention.

It will be seen that the outer surface 90 of the anchoring member 80 is substantially C-shaped preferably, and has an outer surface substantially of a shape of a portion of a cylinder of the same diameter as the housing side wall 12.

As thus described it is believed that this invention has fulfilled the objects above set forth.

From the foregoing description, it is thought to be obvious that an auto light holder constructed in accordance with our invention is particularly well adapted for use, by reason of the convenience and facility with which it may be assembled and operated, and it will also be obvious that our invention can be changed and modified without departing from the principles and spirit thereof, and for this reason, we do not wish to be understood as limiting ourselves to the precise arrangement and formation of the several parts herein shown in carrying out our invention in practice, except as claimed.

We claim:

1. In combination with a wheeled vehicle of a public road traveling type, a light housing having a substantially cylindrical side wall, a suspended light socket and bulb assembly disposed in an area outlined by said side wall and spaced therefrom, at least two resilient shock absorbing members attached to said socket and extending away from said socket in sufficient directions for substantially maintaining said socket in a desired position spaced from the sides of said housing, and means for anchoring the outer ends of said resilient members to said cylindrical wall, said anchoring means having well-engaging portions pressing against said cylindrical wall at sufficient points for holding said anchoring means in place against said cylindrical wall under the circumstance of normal vibratory forces to which said cylindrical wall would be subjected during normal operation of said vehicle, and means attaching the outer ends of said resilient shock absorbing members to said anchoring means, said anchoring means being sufficiently adjustable to permit movement of its side wall engaging portions in directions away from said side wall for permitting the insertion and removal of said anchoring means into and from said housing during assembly and disassembly.

2. The combination of claim 1 in which said anchoring means is a substantially C-shaped member having sufficient resiliency to permit said adjustability.

3. The combination of claim 1 in which said anchoring means is a substantially C-shaped member having sufficient resiliency to permit said adjustability, the outer surface of said C-shaped anchoring means being substantially of the shape of a portion of a cylinder of the same diameter as the said housing side wall.

References Cited by the Examiner

UNITED STATES PATENTS

| | | | |
|---|---|---|---|
| 1,555,902 | 10/1925 | Brady | 240—90 |
| 1,817,091 | 8/1931 | Miller | 249—90 |

JOHN M. HORAN, *Primary Examiner.*

NORTON ANSHER, CHARLES C. LOGAN II,
*Examiners.*